(12) United States Patent
Bohra et al.

(10) Patent No.: US 12,314,136 B2
(45) Date of Patent: *May 27, 2025

(54) QUERY RETRIES USING QUIESCE NOTIFICATIONS

(71) Applicant: Snowflake Inc., Bozeman, MT (US)

(72) Inventors: Ata E. Husain Bohra, San Jose, CA (US); Daniel Geoffrey Karp, San Carlos, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,471

(22) Filed: May 31, 2023

(65) Prior Publication Data

US 2023/0305928 A1 Sep. 28, 2023

Related U.S. Application Data

(63) Continuation of application No. 17/823,877, filed on Aug. 31, 2022, now Pat. No. 11,704,200, which is a
(Continued)

(51) Int. Cl.
*G06F 11/14* (2006.01)
*G06F 9/50* (2006.01)
(Continued)

(52) U.S. Cl.
CPC ........ *G06F 11/1435* (2013.01); *G06F 9/5022* (2013.01); *G06F 9/5038* (2013.01);
(Continued)

(58) Field of Classification Search
CPC .. G06F 11/1435; G06F 9/5022; G06F 9/5038; G06F 9/505; G06F 16/245;
(Continued)

(56) References Cited

U.S. PATENT DOCUMENTS 10,860,450 B1 12/2020 Dageville et al.
11,507,465 B1 11/2022 Husain Bohra et al.
(Continued)

OTHER PUBLICATIONS

U.S. Appl. No. 17/647,687, now U.S. Pat. No. 11,507,465, filed Jan. 11, 2022, Query Retry Using Quiesce Notification.
(Continued)

*Primary Examiner* — Eric C Wai
(74) *Attorney, Agent, or Firm* — SCHWEGMAN LUNDBERG & WOESSNER, P.A.

(57) ABSTRACT

The subject technology selects a candidate compute service manager from a set of instances of compute service managers to issue a query restart by selecting an execution node, the execution node being included in a particular virtual warehouse associated with the candidate compute service manager, the selecting facilitating improving utilization of cluster resources and improving query execution on the selected candidate compute service manager. The subject technology receives a notification indicating that a particular compute service manager has been quiesced. The subject technology determines a set of jobs that are not yet scheduled for execution and eligible for query retry. The subject technology determines a second set of jobs from the set of jobs to send at least another compute service manager for execution. The subject technology sends the second set of jobs to at least another compute service manager for execution.

30 Claims, 8 Drawing Sheets

Related U.S. Application Data continuation of application No. 17/647,687, filed on Jan. 11, 2022, now Pat. No. 11,507,465.

(60) Provisional application No. 63/228,075, filed on Jul. 31, 2021.

(51) Int. Cl.
    *G06F 16/245* (2019.01)
    *G06F 16/25* (2019.01)

(52) U.S. Cl.
    CPC ............ *G06F 9/505* (2013.01); *G06F 16/245* (2019.01); *G06F 16/256* (2019.01)

(58) Field of Classification Search
    CPC ............... G06F 16/256; G06F 11/1482; G06F 11/3006; G06F 2201/80; G06F 11/3433
    See application file for complete search history.

(56) References Cited

U.S. PATENT DOCUMENTS

| | | |
|---|---|---|
| 11,704,200 B2 | 7/2023 | Husain Bohra et al. |
| 2005/0047420 A1 | 3/2005 | Tanabe et al. |
| 2009/0300210 A1* | 12/2009 | Ferris .................. H04L 47/78 709/235 |
| 2016/0026952 A1 | 1/2016 | Cancilla et al. |
| 2022/0050714 A1 | 2/2022 | Grimshaw et al. |
| 2023/0030636 A1 | 2/2023 | Husain Bohra et al. |

OTHER PUBLICATIONS

U.S. Appl. No. 17/823,877, now U.S. Pat. No. 11,704,200, filed Aug. 31, 2022, Quiesce Notifications for Query Retries.

"U.S. Appl. No. 17/647,687, Non Final Office Action mailed Mar. 30, 2022", 17 pages.

"U.S. Appl. No. 17/647,687, Response filed Jun. 29, 2022 to Non Final Office Action mailed Mar. 30, 2022", 16 pages.

"U.S. Appl. No. 17/647,687, Notice of Allowance mailed Aug. 10, 2022", 5 pages.

"U.S. Appl. No. 17/823,877, Non Final Office Action mailed Nov. 10, 2022", 7 pages.

"U.S. Appl. No. 17/823,877, Response filed Feb. 9, 2023 to Non Final Office Action mailed Nov. 10, 2022", 11 pages.

"U.S. Appl. No. 17/823,877, Notice of Allowance mailed Mar. 3, 2023", 5 pages.

* cited by examiner

QUERY RETRIES USING QUIESCE NOTIFICATIONS

CROSS-REFERENCE TO RELATED APPLICATIONS

This application is a continuation of U.S. patent application Ser. No. 17/823,877, filed Aug. 31, 2022, entitled "QUIESCE NOTIFICATIONS FOR QUERY RETRIES," which is a continuation of U.S. patent application Ser. No. 17/647,687, filed Jan. 11, 2022, entitled "QUERY RETRY USING QUIESCE NOTIFICATION,", which claims priority to U.S. Provisional Patent Application Ser. No. 63/228,075, filed Jul. 31, 2021, entitled "QUERY RETRY USING QUIESCE NOTIFICATION," and the contents of each of which are incorporated herein by reference in their entirety for all purposes.

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
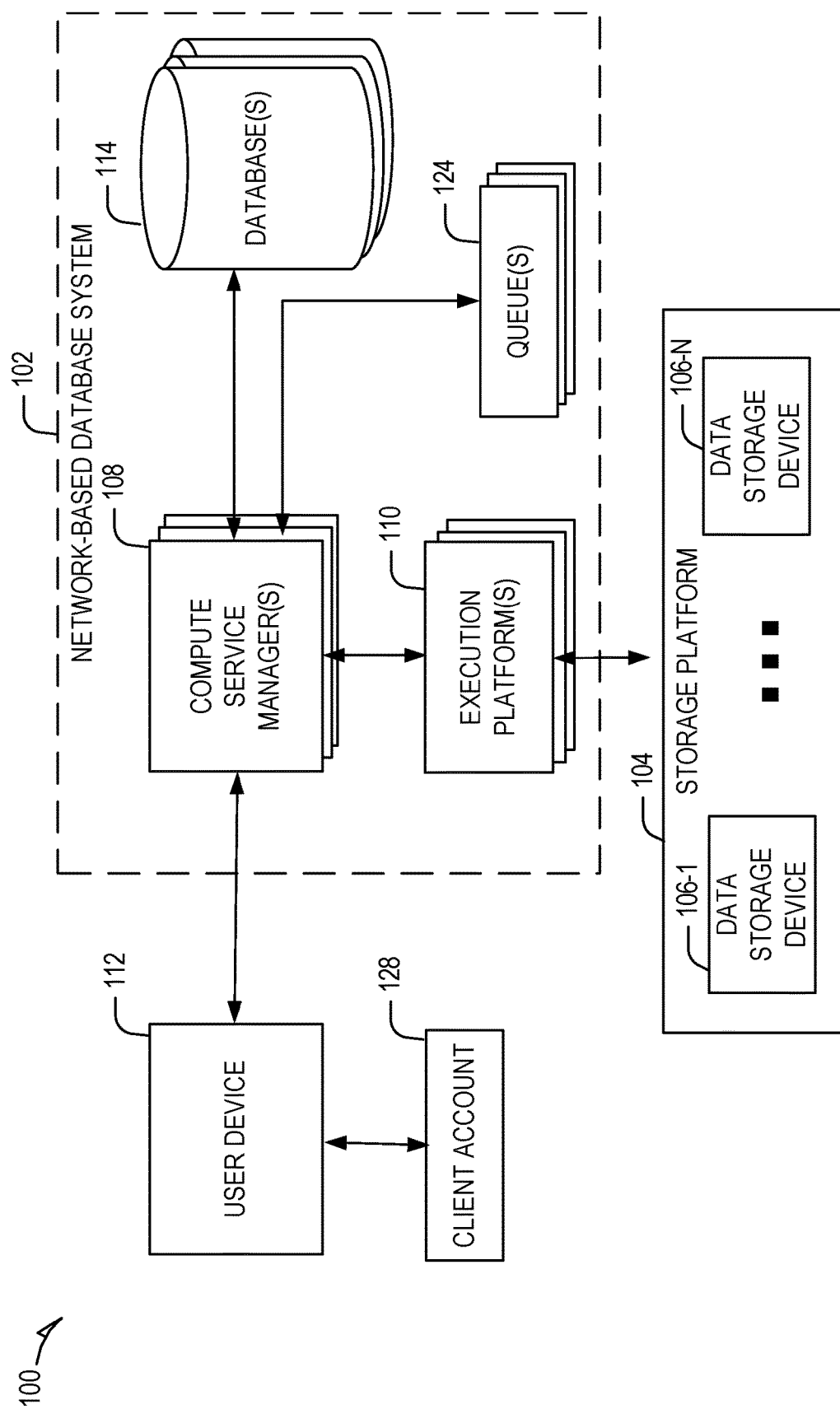
FIG. 1A illustrates an example computing environment that includes a network-based database system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

In some instances, the execution of a query fails. Query execution may fail for a number of different reasons, including an intermittent fault or a software regression. An intermittent fault may be caused by a hardware failure, a power outage, a fault electrical connection, a change in temperature, vibration, and others. Intermittent faults are very difficult to predict and identify. A software regression may be caused by a bug or error in software code. Software regressions can cause continued issues with query execution and should therefore be identified and repaired. In some instances, it is desirable to retry failed queries so that a valid query response can be returned to a client.

In light of the foregoing, embodiments of the subject technology provide automated query retry in a database system using techniques that optimistically finalize jobs not running on a given compute manager instance along with providing a load-aware compute manager instance selection scheme to better utilize cluster resources as well as improving the changes of query execution on the selected instance.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

In embodiments described herein, a resource manager, as included as a component of a compute service manager, schedules and manages the execution of a job, which can include one or more discrete tasks performed in a network-based database system. The resource manager may schedule and manage the execution of such tasks, by utilizing a cluster (e.g., where a cluster can include a pool of virtual warehouses and/or instances of compute service managers). It should be appreciated that the resource manager may manage the execution of any number of tasks or type of tasks. Moreover, as discussed further herein, a query retry engine can perform any of the aforementioned operations for retrying a query (e.g., one that has failed previously).

FIG. 1A illustrates an example computing environment 100 that includes a network-based database system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1A. However, a skilled artisan will readily recognize that various additional functional components may be included as part of the computing environment 100 to facilitate additional functionality that is not specifically described herein.

In some embodiments, the network-based database system 102 includes a compute service manager 108, which is in communication with a queue 124, a client account 128, database 114, and an execution platform 110. In an embodiment, the compute service manager 108 does not receive any direct communications from a client account 128 and only receives communications concerning jobs from the queue 124. In particular implementations, the compute service manager 108 can support any number of client accounts 128 such as end users corresponding to respective one or more of user device 112 that provide data storage and retrieval requests, system administrators managing the systems and methods described herein, and other components/devices that interact with compute service manager 108. As used herein, compute service manager 108 may also be referred to as a "global services system" that performs various functions as discussed herein.

Although the above discussion highlights a single compute service manager, execution platform, database, and queue, embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and a database 114. The network-based database system 102 hosts and provides database services to multiple client accounts. Administrative users can create and manage identities (e.g., users, roles, and groups) and use permissions to allow or deny access to the identities to resources and services.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the network-based data-warehouse system 102. As shown, the user is associated with a client account 128. In some embodiments, the compute service manager 108 does not receive any direct communications from the user device 112 and only receives communications concerning jobs from a queue 124 within the network-based database system 102.

The compute service manager 108 is also coupled to database 114, which is associated with the data stored the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML commands being performed, wherein one or more of DML commands constitute the trigger event.

The compute service manager 108 may receive rules or parameters from the client account 128 and such rules or parameters may guide the compute service manager 108 in scheduling and managing internal jobs. The client account 128 may indicate that internal jobs should only be executed at certain times or should only utilize a set maximum amount of processing resources. The client account 128 may further indicate one or more trigger events that should prompt the compute service manager 108 to determine that a job should be performed. The client account 128 may provide parameters concerning how many times a task may be re-executed and/or when the task should be re-executed.

The compute service manager 108 is in communication with a queue 124. In an embodiment, the compute service manager 108 does not receive any direct communications from a client account 128 and only receives communications concerning jobs from the queue 124. In particular implementations, the compute service manager 108 can support any number of client accounts 128 such as end users providing data storage and retrieval requests, system administrators managing the systems and methods described herein, and other components/devices that interact with compute service manager 108.

The queue 124 may provide a job to the compute service manager 108. One or more jobs may be stored in the queue 124 in an order of receipt and/or an order of priority, and each of those one or more jobs may be communicated to the compute service manager 108 to be scheduled and executed.

In an implementation, the queue 124 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124 may determine internal jobs that should be performed to improve the performance of the database and/or to improve the organization of database data. In an embodiment, the queue 124 does not store queries to be executed for a client account but instead only includes stores database jobs that improve database performance.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1A, the data storage devices 106-1 to 106-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1A as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1A, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 1B:
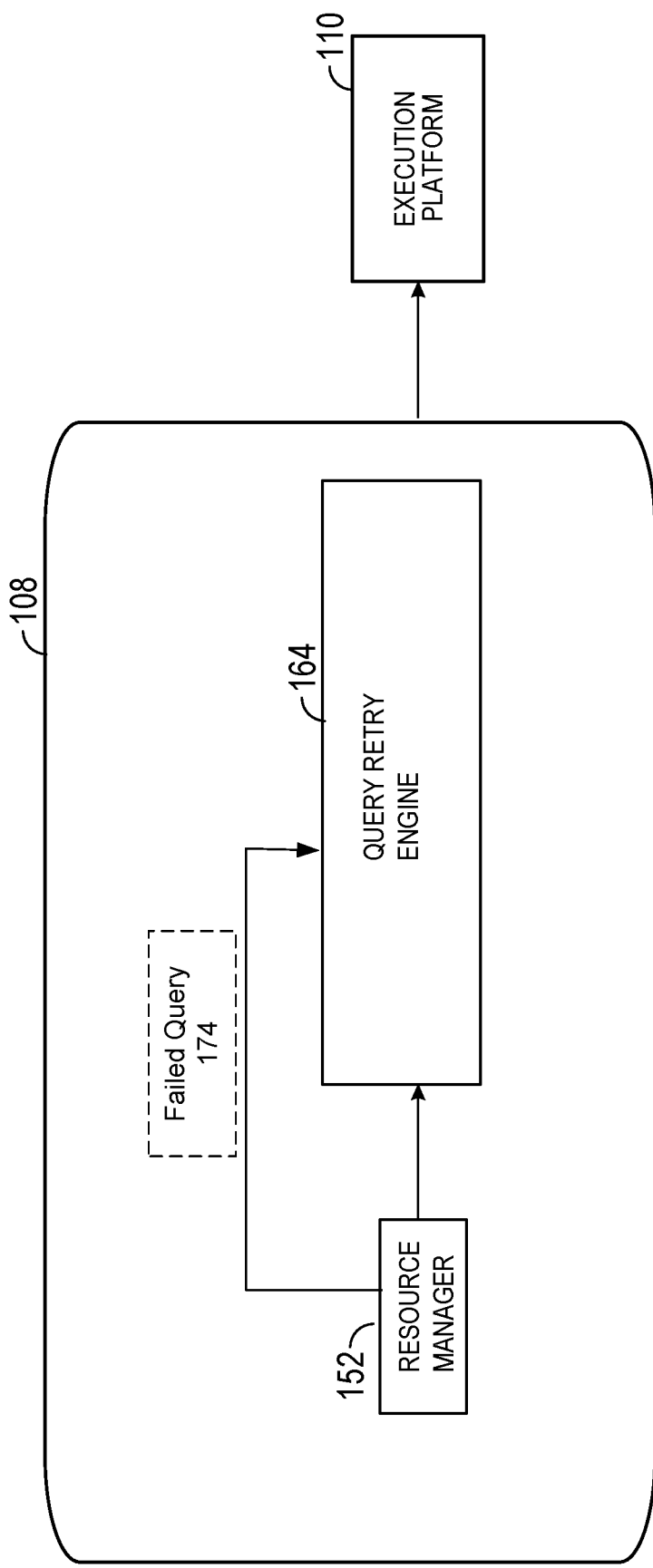
FIG. 1B is a block diagram of an example embodiment of components for executing queries, including performing query retries, on a database system (e.g., a network-based database system), in accordance with some embodiments of the present disclosure.

FIG. 1B is a block diagram of an example embodiment of components for executing queries, including performing query retries, on a database system (e.g., the network-based database system 102). In an embodiment, a process flow is carried out by components of the compute service manager 108 that are configured to manage and assign query retry tasks and configured to manage and assign the execution of queries received from client accounts. In an example process flow, a resource manager 152 receives a query from a client account. The resource manager 152 references metadata to identify one or more files (e.g., micro-partitions can be organized into files) that are responsive to the query. The resource manager 152 assigns processing of the one or more files to one or more execution nodes of an execution platform 110 (discussed further in FIG. 3 below). The resource manager determines that the original execution of the query failed.

In an example, if the original execution of the query failed due to an internal error, rather than a non-internal "user error" based on a user's query text or data, then the resource manager 152 transfer the query to a compute service manager 108. A non-internal user error may include an error in the Structured Query Language (SQL) text of the query or an error based on the actual data being processed.

Subsequently, the query retry engine 164 receives an indication of a failed query 174. In an embodiment, the query retry engine 164 receives this indication by receiving a query retry job in its queue. In an embodiment, the resource manager 152 transfers the query by placing the query in the queue of the query retry engine 164. The indication of the failed query 174 may be an indication that only indicates the query failed and does not provide additional information about why or when the query failed. As discussed further herein, in an embodiment, the query retry engine 164 determines tasks to be performed to retry the query and assigns those tasks (e.g., as part of a given job associated with the failed query) to an instance of a compute service manager (e.g., different than the instance corresponding to the compute service manager 108).

In an embodiment, query retry is the mechanism to re-attempt a failed query execution if possible on another instance of a compute service manager of the same cluster running the same version and/or an immediate previous released version. In some implementations, a candidate compute service manager instance from all valid candidate compute service manager instances can be randomly selected. Alternatively, in some embodiments, selection of a compute service instance is based on a load-aware (e.g., an amount of resources or jobs that a candidate compute service manager is currently or has utilized e.g., within a particular period of time such as a 5 to 10 minute window of time in the past) approach to better utilize cluster resources as well as improving the changes of query execution on the selected instance.

In some embodiments, the query retry engine 164 performs the following operations:
1. Requests and utilizes (e.g., after the request is answered) information regarding an instance identifier of a compute service manager instance to a particular job in order to perform mapping of cluster information to information related to compute service manager instance(s).
2. Retrieves information related to all instances of compute service managers in the compute service manager cluster. In an embodiment, this information can be provided as a list (or other appropriate data structure/format).
3. Filters the list (or information in another format) prepared in #2, the valid candidates should be: healthy, running a desired (or required) compute service manager instance version and safe from quiescing.
4. Sorts the candidate compute service manager instances using a load-factor (e.g., sorting by least loaded to most loaded instances of compute service managers), which can be determined at least from a current workload of a given instance of a compute service manager (e.g., based on a number of jobs that the compute service manager has performed within a window of time or a number of jobs that is still in a queue to perform, and the like).
5. Selects the next candidate compute service manager to issue query restart by randomly selecting an execution node (e.g., where the candidate compute service manager is executing) among a top threshold percentage (e.g., 5% to 10%) of candidate nodes. In an example, the randomness in selecting such an execution node avoids queries being dispatched to the same instance.

In some implementations, computing a load-factor value of a given instance of a compute service manager is based at least in part on metrics over a previous window of time (e.g., 5 to 10 minutes, and the like) that includes an average of statistics such as CPU or processor utilization metrics of an execution system (e.g., included as part of a virtual warehouse discussed in FIG. 3 below) or metrics involving a single virtual warehouse (e.g., and all included execution systems therein).

Further, in some scenarios, instances of compute service managers are quiesced (e.g., terminated or shut down) in a frequent manner due to various reasons e.g., upgrades, downgrades, faulty instance (e.g., replacement), rebalancing for clusters, cluster scaling, cluster instance type change, and the like. However, a quiesced instance should be in service until all scheduled jobs for execution are completed (e.g., failed or successful). Consequently, embodiments of the subject technology can minimize a delay in enabling a given instance to be more quickly terminated, thereby improving an overall service operational efficiency.

In addition, in some embodiments, the query retry engine 164 (or resource manager 152) optimistically finalize the jobs yet not running on a virtual warehouse on obtaining a quiesce notification.

In an implementation, the following operations are performed by components of the compute service manager (e.g., the aforementioned resource manager or query retry engine):
1. Instance of compute service manager receives a quiesce notification, after which the instance would be removed from the execution node topology (e.g., as discussed in FIG. 3) and would likely not receive new execution requests from client accounts and/or is advertised for query-retries.
2. As part of handling the request, the instance of compute service manager scans all scheduled jobs generating a list of eligible jobs meeting following criteria: a job not (yet) scheduled on any virtual warehouse and eligible for query-retry.
3. The instance of compute service manager analyzes a list of jobs determined in step #2 and re-distributes the job on another instance of compute service manager for execution (e.g., with a same version as the current instance) via a query retry mechanism (e.g., canceling any current running job(s) and ensure query-retry gets triggered while cleaning up the current job(s))

In some implementations, a quiesce trigger mechanism is provided based on 1) receiving a trigger after removing the node from the topology, or 2) send signal as soon as the decision is made, but, receiving wait for timeout (e.g., based on refresh threshold) before acting on it.

In some implementations, a reliable determination of jobs scheduled on an instance of compute service manager, but, yet not scheduled on any virtual warehouse is provided. For example, it can be advantageous to drop a marker while scanning to avoid virtual warehouse scheduling racing against the quiesce optimization task. This be implemented in multiple phases:
1. Avoid retrying a job which has yet to be scheduled in a virtual warehouse, and ensure that no execution node steps are executed/scheduled for this job until this time.
2. Providing intelligent mechanism to filter out jobs which are running on a virtual warehouse, which can utilize heuristics taking inputs as: 1) % completion based on: assigned-files and scanned-files details per job, 2) number of step jobs executed/scheduled so far (e.g., not all step executions are equally costly)

Figure 2:
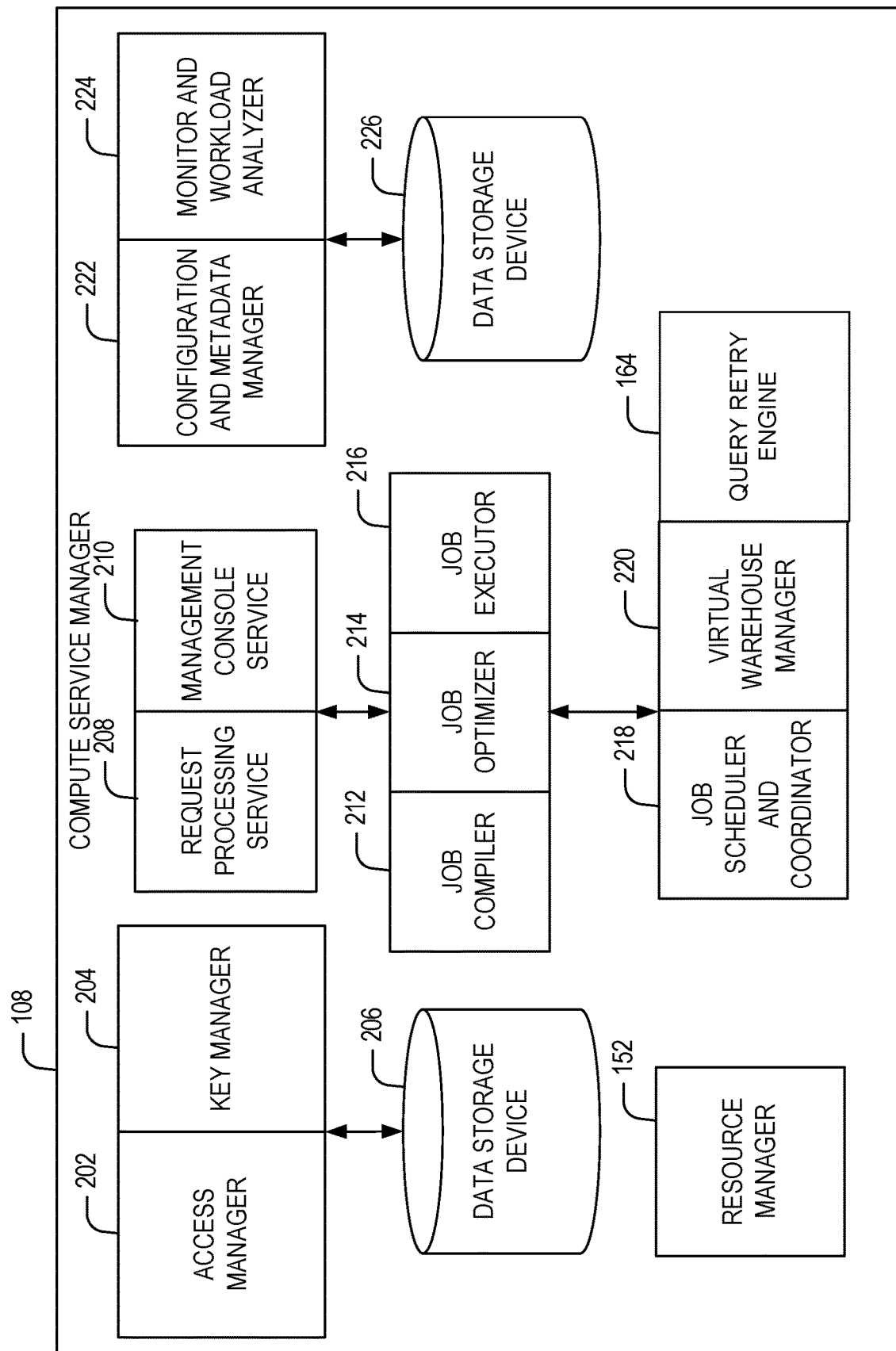
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110, storage devices in storage platform 104, or any other storage device.

Figure 3:
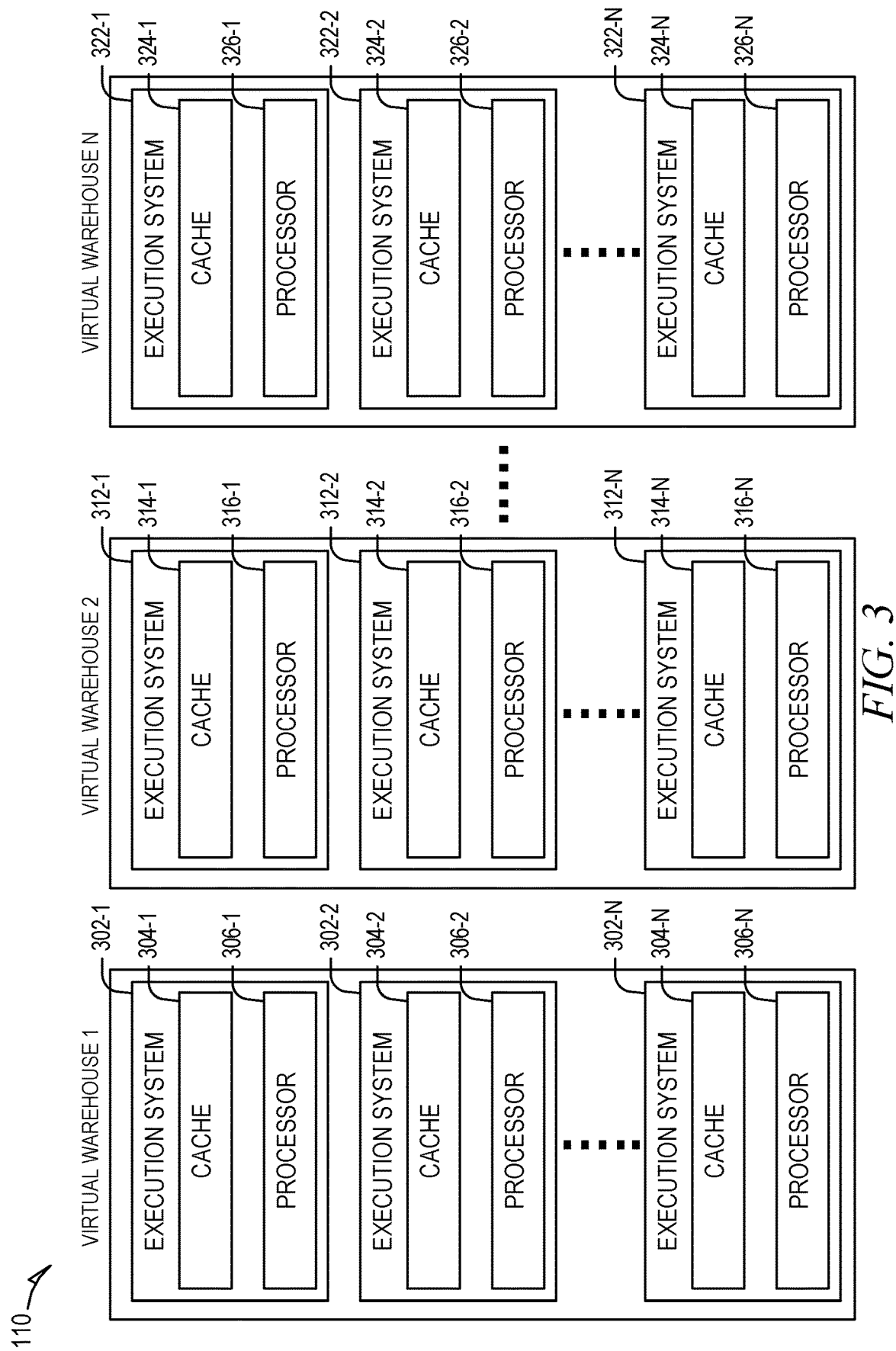
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1A. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
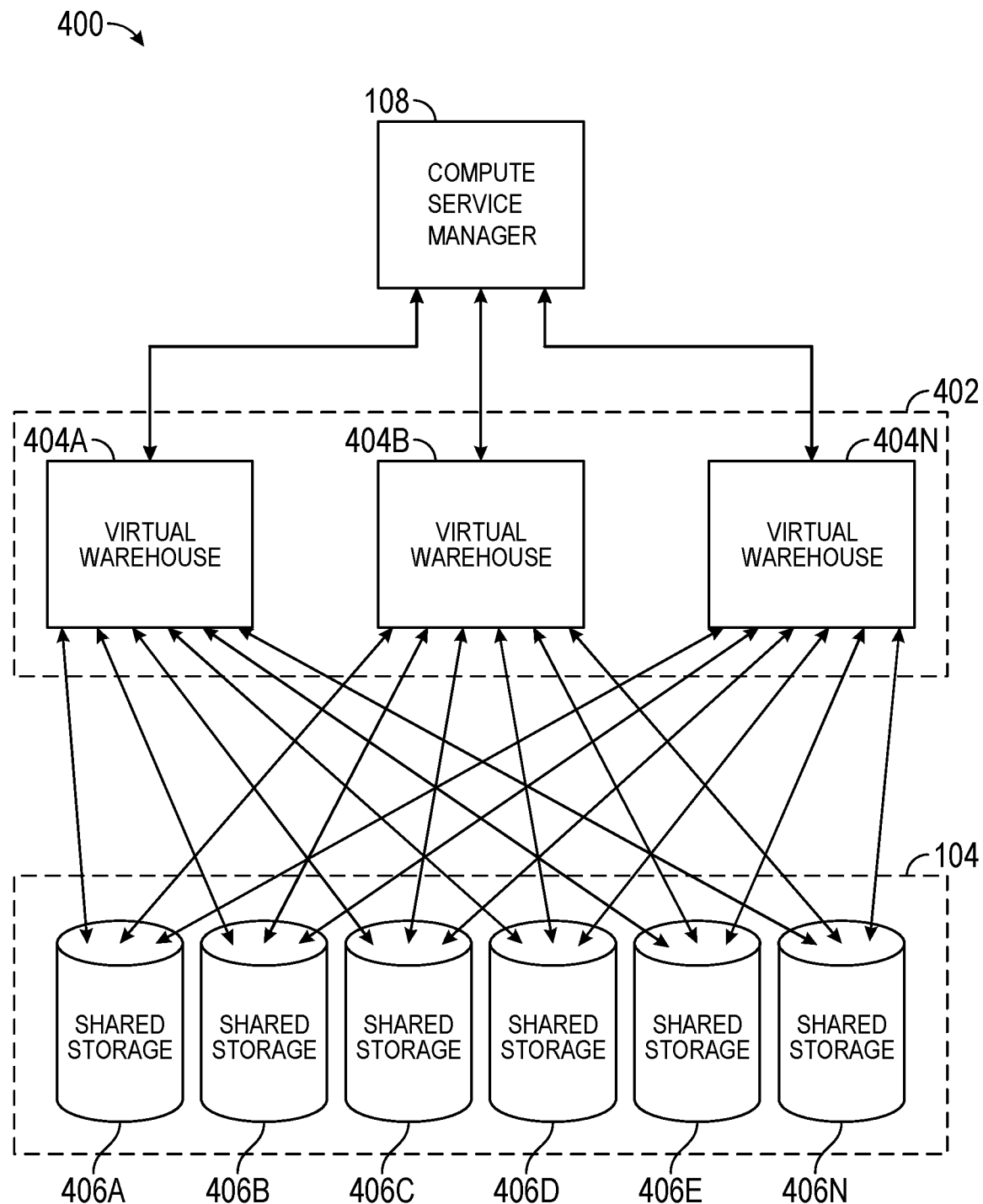
FIG. 4 is a block diagram depicting an example computing environment with a compute service manager in communication with multiple virtual warehouses from a virtual warehouse pool.

FIG. 4 is a block diagram depicting an example computing environment 400 with the compute service manager 108 in communication with multiple virtual warehouses from a virtual warehouse pool 402. In computing environment 400, the compute service manager 108 has access to shared storage devices 406a, 406b, 406c, 406d, 406e and 406n through virtual warehouses 404a, 404b, and 404n. In particular embodiments, shared storage devices 406a-406n are contained in the storage platform 104 and are accessible by any virtual warehouse implemented in the execution platform 110. In some embodiments, the compute service manager 108 may access one of the virtual warehouses 404a-404n using a data communication network such as the Internet. In some implementations, a client account may specify that the compute service manager 108 (configured for storing internal jobs to be completed) should interact with a particular virtual warehouse 404a-404n at a particular time.

In an embodiment (as illustrated), each virtual warehouse 404a-404n can communicate with all shared storage devices 406a-406n. In some embodiments, each virtual warehouse 404a-404n is configured to communicate with a subset of all shared storage devices 406a-406n. In such an arrangement, an individual client account associated with a set of data may send all data retrieval and data storage requests through a single virtual warehouse and/or to a certain subset of the shared storage devices 406a-406n. Further, where a certain virtual warehouse 404a-404n is configured to communicate with a specific subset of shared storage devices 406a-406n, the configuration is dynamic. For example, virtual warehouse 404a may be configured to communicate with a first subset of shared storage devices 406a-406n and may later be reconfigured to communicate with a second subset of shared storage devices 406a-406n.

In an embodiment, the compute service manager 108 receives data retrieval, data storage, and data processing requests. In response to such requests, the compute service manager 108 utilizes the virtual warehouse pool 402 in order to route the requests to an appropriate virtual warehouse 404a-404n. In some implementations, the virtual warehouse pool 402 provides a dynamic assignment of jobs to one of the virtual warehouses 404a-404n from the virtual warehouse pool 402.

In some embodiments, fault tolerance systems create a new virtual warehouse in response to a failure of a virtual warehouse. The new virtual warehouse may be in the same virtual warehouse group or may be created in a different virtual warehouse group at a different geographic location.

The systems and methods described herein allow data to be stored and accessed as a service that is separate from computing (or processing) resources. Even if no computing resources have been allocated from the execution platform 110, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Figure 5:
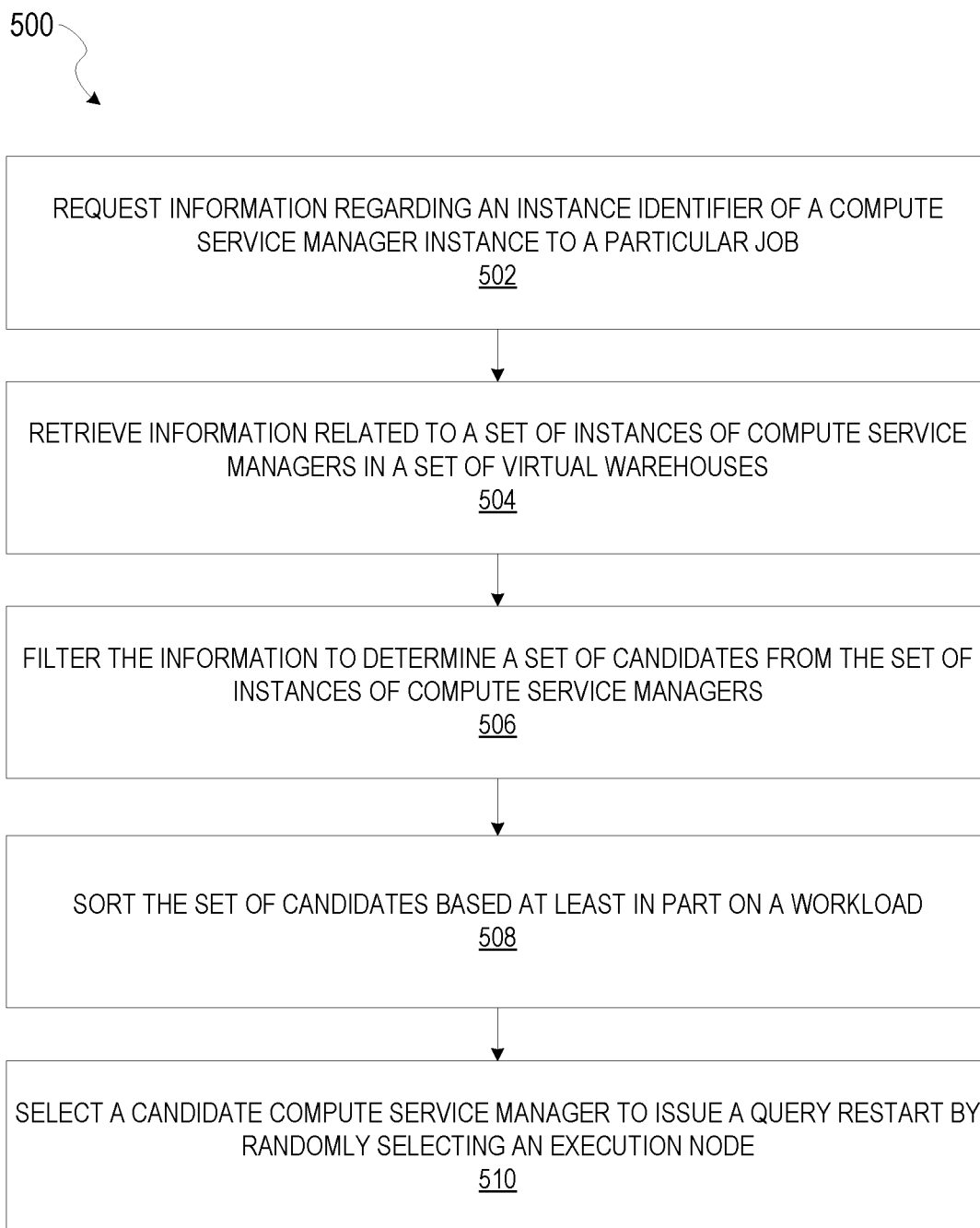
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102. Accordingly, the method 500 is described below, by way of example with reference thereto. However, it shall be appreciated that the method 500 may be deployed on various other hardware configurations and is not intended to be limited to deployment within the network-based database system 102.

At operation 502, the compute service manager 108 (or component thereof discussed previously e.g., the resource manager 152 and/or the query retry engine 164) request information regarding an instance identifier of a compute service manager instance to a particular job.

At operation 504, the compute service manager 108 retrieve information related to a set of instances of compute service managers in a set of virtual warehouses.

At operation 506, the compute service manager 108 filters the information to determine a set of candidates from the set of instances of compute service managers.

At operation 508, the compute service manager 108 sorts the set of candidates based at least in part on a workload.

At operation 510, the compute service manager 108 selects a candidate compute service manager to issue a query restart by randomly selecting an execution node.

Figure 6:
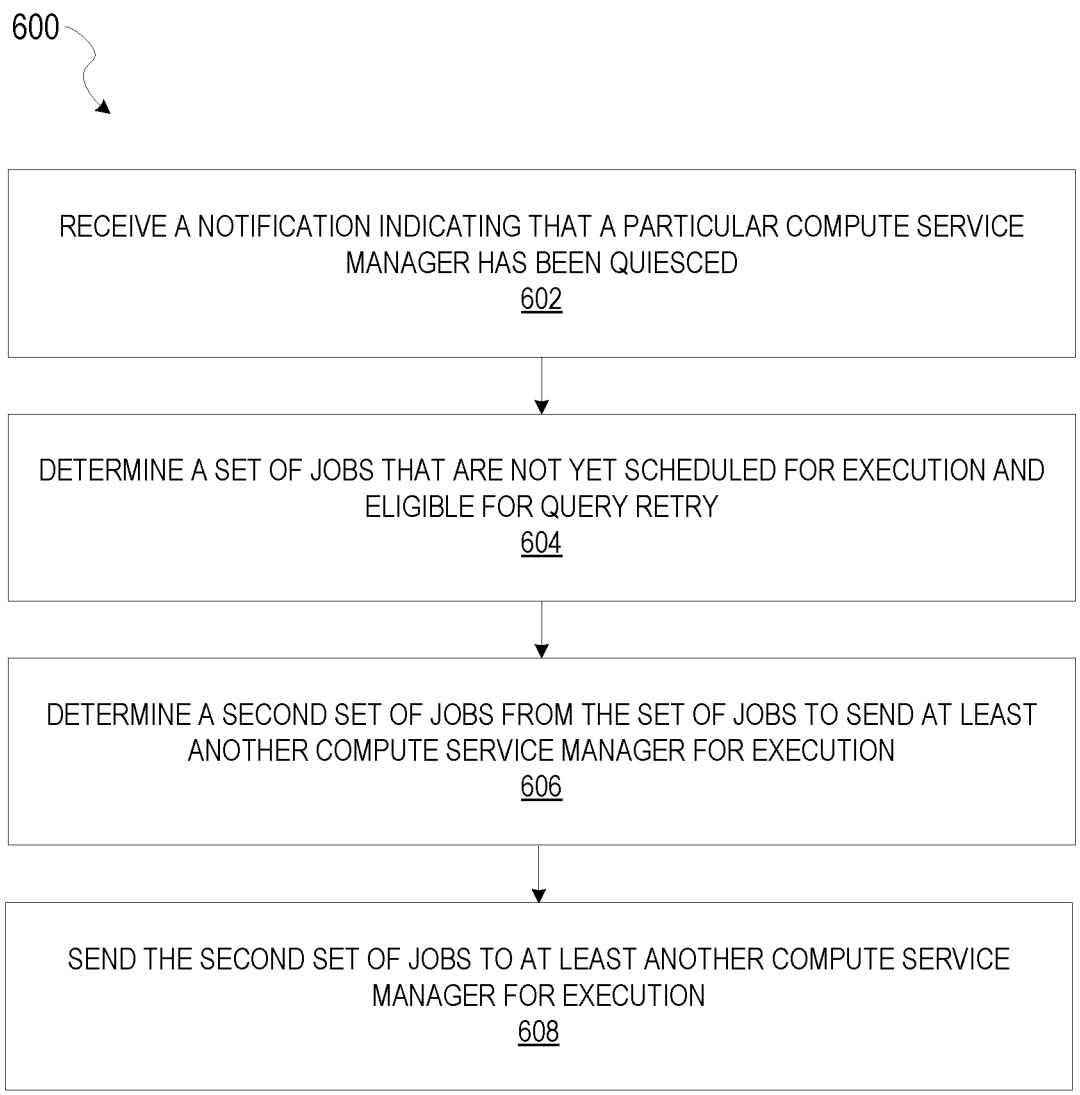
FIG. 6 is a flow diagram illustrating operations of a database system in performing a method, in accordance with some embodiments of the present disclosure.

FIG. 6 is a flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102. Accordingly, the method 600 is described below, by way of example with reference thereto. However, it shall be appreciated that the method 600 may be deployed on various other hardware configurations and is not intended to be limited to deployment within the network-based database system 102.

At operation 602, the compute service manager 108 (or component thereof discussed previously e.g., the resource manager 152 and/or the query retry engine 164) receives a notification indicating that a particular compute service manager has been quiesced.

At operation 604, the compute service manager 108 determines a set of jobs that are not yet scheduled for execution and eligible for query retry.

At operation 606, the compute service manager 108 determine a second set of jobs from the set of jobs to send at least another compute service manager for execution.

At operation 608, the computer service manager 108 sends the second set of jobs to at least another compute service manager for execution.

Figure 7:
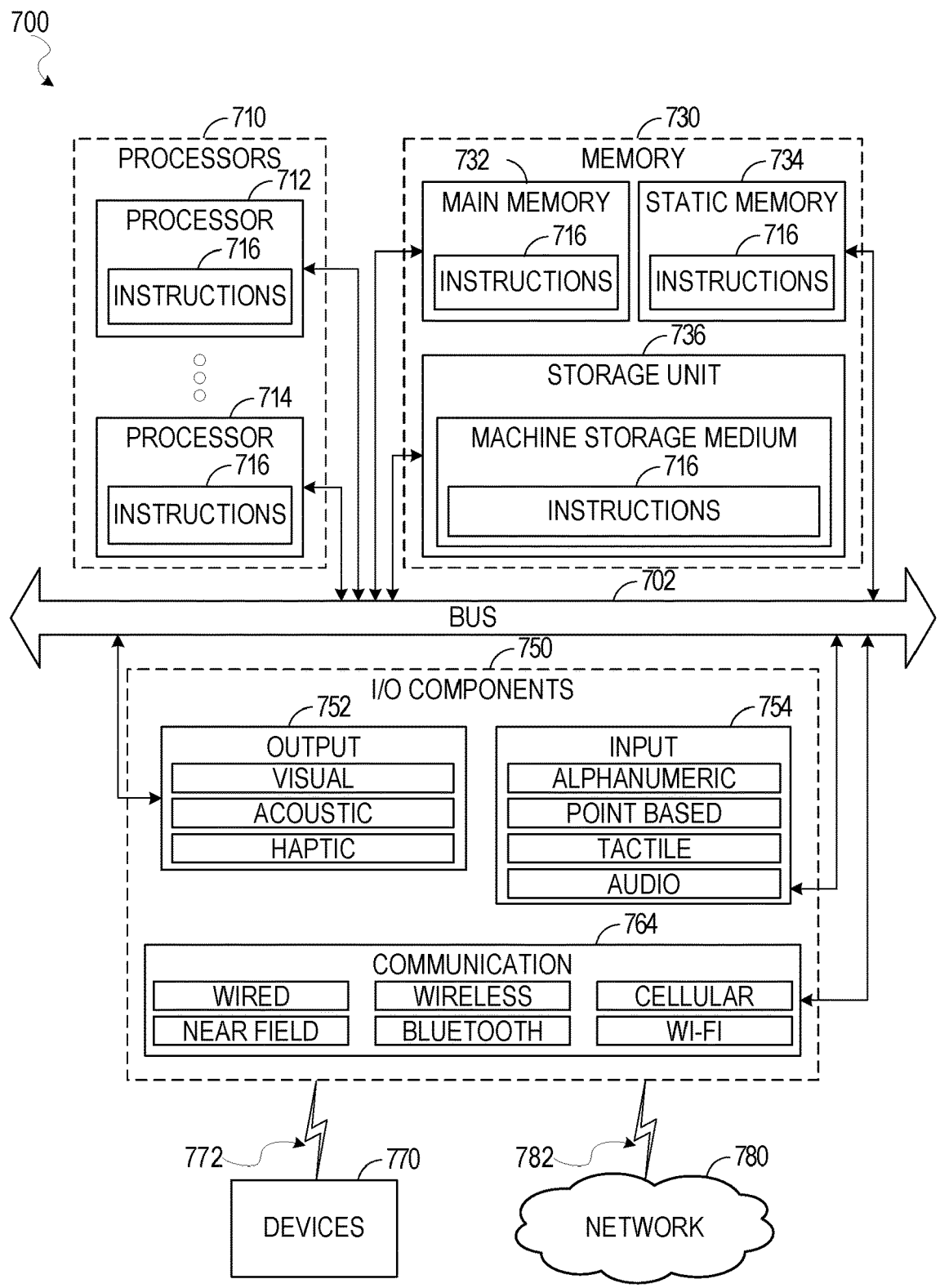
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described above. As another example, the instructions 716 may cause the machine 700 to implement portions of the functionality illustrated in any one or more of the previous mentioned figures discussed above. In this way, the instructions 716 transform a general, non-programmed machine into a particular machine 700 (e.g., the compute service manager 108, the execution platform 110, and the user device 112) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108, the execution platform 110, and the devices 770 may include the user device 112 or any other computing device described herein as being in communication with the network-based database system 102 or the storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a WiFi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 600 and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A network-based database system comprising:
   at least one hardware processor; and
   a memory storing instructions that cause the at least one hardware processor to perform operations comprising:
   determining, from a set of instances of compute service managers, a set of candidate compute service managers that are safe from quiescing, the determining based at least in part on determining that each of the set of candidate compute service managers has yet to undergo upgrading, downgrading, rebalancing for clusters, cluster scaling, or a cluster instance type change;
   selecting a candidate compute service manager from the set of candidate compute service managers to issue a query restart by selecting an execution node, the execution node being included in a particular virtual warehouse associated with the candidate compute service manager;

receiving a notification indicating that a particular compute service manager has been quiesced;

determining a set of jobs that are not yet scheduled for execution and eligible for query retry;

determining a second set of jobs from the set of jobs to send at least another compute service manager for execution, the at least another compute service manager being selected based on an amount of resources that at least another compute service manager is currently utilizing;

sending the second set of jobs to the at least another compute service manager for execution, the sending enabling better utilization of cluster resources; and executing, by the at least another compute service manager, the second set of jobs.

2. The network-based database system of claim 1, wherein determining the set of jobs that are not yet scheduled for execution and eligible for query retry comprises:

identifying a particular job that has yet to be schedules in a particular virtual warehouse; and ensuring that the particular job is not performed by an execution node while determining the set of jobs.

3. The network-based database system of claim 1, wherein determining the set of jobs that are not yet scheduled for execution and eligible for query retry comprises:

filtering out at least one job that is running on a virtual warehouse based on a set of heuristics.

4. The network-based database system of claim 3, wherein the set of heuristics comprises a percentage completion based on assigned files and scanned files details per job, wherein the percentage completion is further based on a number of step jobs executed or scheduled up to a current time.

5. The network-based database system of claim 1, wherein the operations further comprise:

prior to selecting the candidate compute service manager, retrieving information related to the set of instances of compute service managers, each instance of a particular compute service manager being associated with a set of virtual warehouses, each virtual warehouse from the set of virtual warehouses including a particular set of execution nodes; and sorting the set of candidate compute service managers based at least in part on each workload of each of the set of candidate compute service managers.

6. The network-based database system of claim 5, wherein sorting the set of candidates based on the workload comprises:

determining a current workload of each instance from the set of instances of the compute service managers, the current workload comprising a number of jobs that the each instance has performed within a window of time or a number of jobs that is still in a queue to perform; and sorting each instance based at least in part on the current workload corresponding to each instance, the sorting based on an ascending order from least loaded to most loaded.

7. The network-based database system of claim 6, wherein the current workload comprises a number of jobs that a particular instance of the compute service manager has performed within a window of time or a number of jobs that is still in a queue to perform.

8. The network-based database system of claim 6, wherein the current workload is based at least in part on metrics over a previous window of time that includes an average of statistics or metrics involving a single virtual warehouse.

9. The network-based database system of claim 1, wherein selecting the candidate compute service manager to issue the query restart by selecting the execution node comprises:

selecting the execution node among a top threshold percentage of candidate nodes.

10. The network-based database system of claim 1, wherein the operations further comprise:

requesting particular information regarding an instance identifier of a compute service manager instance to a particular job.

11. A method comprising:

determining, from a set of instances of compute service managers, a set of candidate compute service managers that are safe from quiescing, the determining based at least in part on determining that each of the set of candidate compute service managers has yet to undergo upgrading, downgrading, rebalancing for clusters, cluster scaling, or a cluster instance type change;

selecting a candidate compute service manager from the set of candidate compute service managers to issue a query restart by selecting an execution node, the execution node being included in a particular virtual warehouse associated with the candidate compute service manager;

receiving a notification indicating that a particular compute service manager has been quiesced;

determining a set of jobs that are not yet scheduled for execution and eligible for query retry;

determining a second set of jobs from the set of jobs to send at least another compute service manager for execution, the at least another compute service manager being selected based on an amount of resources that at least another compute service manager is currently utilizing;

sending the second set of jobs to at least another compute service manager for execution, the sending enabling better utilization of cluster resources; and executing, by the at least another compute service manager, the second set of jobs.

12. The method of claim 11, wherein determining the set of jobs that are not yet scheduled for execution and eligible for query retry comprises:

identifying a particular job that has yet to be schedules in a particular virtual warehouse; and ensuring that the particular job is not performed by an execution node while determining the set of jobs.

13. The method of claim 11, wherein determining the set of jobs that are not yet scheduled for execution and eligible for query retry comprises:

filtering out at least one job that is running on a virtual warehouse based on a set of heuristics.

14. The method of claim 13, wherein the set of heuristics comprises a percentage completion based on assigned files and scanned files details per job, wherein the percentage completion is further based on a number of step jobs executed or scheduled up to a current time.

15. The method of claim 11, further comprising:

prior to selecting the candidate compute service manager, retrieving information related to the set of instances of compute service managers, each instance of a particular compute service manager being associated with a set of virtual warehouses, each virtual warehouse from the set of virtual warehouses including a particular set of execution nodes; and sorting the set of candidate compute service managers based at least in part on each workload of each of the set of candidate compute service managers.

16. The method of claim 15, wherein sorting the set of candidates based on the workload comprises:

determining a current workload of each instance from the set of instances of the compute service managers, the current workload comprising a number of jobs that the each instance has performed within a window of time or a number of jobs that is still in a queue to perform; and sorting each instance based at least in part on the current workload corresponding to each instance, the sorting based on an ascending order from least loaded to most loaded.

17. The method of claim 16, wherein the current workload comprises a number of jobs that a particular instance of the compute service manager has performed within a window of time or a number of jobs that is still in a queue to perform.

18. The method of claim 16, wherein the current workload is based at least in part on metrics over a previous window of time that includes an average of statistics or metrics involving a single virtual warehouse.

19. The method of claim 11, wherein selecting the candidate compute service manager to issue the query restart by selecting the execution node comprises:

selecting the execution node among a top threshold percentage of candidate nodes.

20. The method of claim 11, further comprising:

requesting particular information regarding an instance identifier of a compute service manager instance to a particular job.

21. A computer-storage medium comprising instructions that, when executed by a processor, configure the processor to perform operations comprising:

determining, from a set of instances of compute service managers, a set of candidate compute service managers that are safe from quiescing, the determining based at least in part on determining that each of the set of candidate compute service managers has yet to undergo upgrading, downgrading, rebalancing for clusters, cluster scaling, or a cluster instance type change;

selecting a candidate compute service manager from the set of candidate compute service managers to issue a query restart by selecting an execution node, the execution node being included in a particular virtual warehouse associated with the candidate compute service manager;

receiving a notification indicating that a particular compute service manager has been quiesced;

determining a set of jobs that are not yet scheduled for execution and eligible for query retry;

determining a second set of jobs from the set of jobs to send at least another compute service manager for execution, the at least another compute service manager being selected based on an amount of resources that at least another compute service manager is currently utilizing;

sending the second set of jobs to at least another compute service manager for execution, the sending enabling better utilization of cluster resources; and executing, by the at least another compute service manager, the second set of jobs.

22. The computer-storage medium of claim 21, wherein determining the set of jobs that are not yet scheduled for execution and eligible for query retry comprises:

identifying a particular job that has yet to be schedules in a particular virtual warehouse; and ensuring that the particular job is not performed by an execution node while determining the set of jobs.

23. The computer-storage medium of claim 21, wherein determining the set of jobs that are not yet scheduled for execution and eligible for query retry comprises:

filtering out at least one job that is running on a virtual warehouse based on a set of heuristics.

24. The computer-storage medium of claim 23, wherein the set of heuristics comprises a percentage completion based on assigned files and scanned files details per job, wherein the percentage completion is further based on a number of step jobs executed or scheduled up to a current time.

25. The computer-storage medium of claim 21, wherein the operations further comprise:

prior to selecting the candidate compute service manager, retrieving information related to the set of instances of compute service managers, each instance of a particular compute service manager being associated with a set of virtual warehouses, each virtual warehouse from the set of virtual warehouses including a particular set of execution nodes; and sorting the set of candidate compute service managers based at least in part on each workload of each of the set of candidate compute service managers.

26. The computer-storage medium of claim 25, wherein sorting the set of candidates based on the workload comprises:

determining a current workload of each instance from the set of instances of the compute service managers, the current workload comprising a number of jobs that the each instance has performed within a window of time or a number of jobs that is still in a queue to perform; and sorting each instance based at least in part on the current workload corresponding to each instance, the sorting based on an ascending order from least loaded to most loaded.

27. The computer-storage medium of claim 26, wherein the current workload comprises a number of jobs that a particular instance of the compute service manager has performed within a window of time or a number of jobs that is still in a queue to perform.

28. The computer-storage medium of claim 26, wherein the current workload is based at least in part on metrics over a previous window of time that includes an average of statistics or metrics involving a single virtual warehouse.

29. The computer-storage medium of claim 21, wherein selecting the candidate compute service manager to issue the query restart by selecting the execution node comprises:

selecting the execution node among a top threshold percentage of candidate nodes.

30. The computer-storage medium of claim 21, wherein the operations further comprise:

requesting particular information regarding an instance identifier of a compute service manager instance to a particular job.

* * * * *